2,945,835

ALIPHATIC ESTER GROUP AND HYDROXYL GROUP CONTAINING INTERPOLYMERS

Earl C. Chapin, Springfield, Mass., and Richard F. Smith, Delmar, N.Y., assignors to Monsanto Chemical Company, St. Louis, Mo., a corporation of Delaware No Drawing. Filed June 20, 1956, Ser. No. 592,490

6 Claims. (Cl. 260—43)

This invention relates to interpolymers containing both aliphatic ester groups and hydroxyl groups. This invention further relates to methods for preparing such interpolymers.

It is an object of this invention to provide novel interpolymers.

A further object of this invention is to provide novel interpolymers containing both aliphatic ester groups and hydroxyl groups.

Yet another object of this invention is to provide efficient processes for preparing novel interpolymers containing both aliphatic ester groups and hydroxyl groups.

In accordance with the present invention, there are provided novel interpolymers containing aliphatic ester groups and 1.5–12.0 weight percent hydroxyl groups. Such interpolymers can be prepared by two alternate processes. In the first process the interpolymers are prepared by heating a vinyl ester of a 1–4 carbon atom saturated aliphatic monocarboxylic acid and allyl alcohol or methallyl alcohol at 150–200° C. under autogenous pressure. Alternatively, such interpolymers can be prepared by reducing interpolymers of a vinyl ester of a 1–4 carbon atom saturated aliphatic monocarboxylic acid and acrolein or methacrolein.

The following examples are set forth to illustrate more clearly the principal and practice of the invention to those skilled in the art.

EXAMPLE I

A mixture of 52 parts of vinyl acetate, 48 parts of allyl alcohol and 1.5 parts of ditertiary butyl peroxide are charged to a sealed reaction vessel and heated for 0.3 hour at 180° C. The product obtained consists of 12 parts of a viscous liquid polymer dissolved in unreacted monomers. The unreacted monomers are removed by vacuum distillation. The recovered polymer contains 6.4 weight percent hydroxyl groups and corresponds to a polymer consisting of 78% vinyl acetate and 22% allyl alcohol.

EXAMPLES II–V

Several additional vinyl acetate-allyl alcohol interpolymers are prepared under the conditions set forth in Table I employing 3% ditertiary butyl peroxide as the catalyst.

Table 1

| Example | II | III | IV | V |
|---|---|---|---|---|
| Parts Vinyl Acetate Charged | 80 | 70 | 50 | 90 |
| Parts Allyl Alcohol Charged | 20 | 30 | 50 | 10 |
| Polymerization Temp. ° C | 180 | 180 | 200 | 180 |
| Polymerization Time, Hours | 2.5 | 0.5 | 0.5 | 0.5 |
| Conversion, Percent | 54 | 40 | 14 | 53 |
| Wt. percent OH groups in Polymer | 3.8 | 4.8 | 7.9 | 2.5 |
| Wt. percent Allyl Alcohol in Polymer | 13 | 17 | 28 | 8.5 |

EXAMPLE VI

A mixture of 60 parts of vinyl butyrate, 40 parts of allyl alcohol and 3 parts of ditertiary butyl peroxide are heated in a sealed reaction vessel for 0.5 hour at 180° C. The polymer is recovered as described in Example I and contains 6.2 weight percent hydroxyl groups. The conversion is 23%.

EXAMPLE VII

A mixture of 50 parts of vinyl acetate, 40 parts of allyl alcohol, 10 parts of ethyl acrylate and 2.5 parts of ditertiary butyl peroxide are charged to a sealed reaction vessel and heated for 0.5 hour at 180° C. The polymer is recovered as described in Example I and contains 8 weight percent hydroxyl groups. The conversion is approximately 34%.

The interpolymers of this invention contain structural units of the formula:

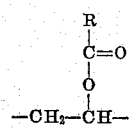

where R is selected from the group consisting of hydrogen and alkyl groups containing up to 3 carbon and structural units of the formula:

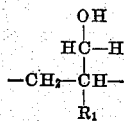

where $R_1$ is selected from the group consisting of hydrogen and methyl radicals. Preferably, the interpolymers are interpolymers of a vinyl ester of a 1–4 carbon atom saturated aliphatic monocarboxylic acid and an unsaturated alcohol of the group consisting of allyl alcohol, methallyl alcohol and mixtures thereof. Alternatively, the interpolymers are reduced interpolymers of a vinyl ester of a 1–4 carbon atom saturated aliphatic monocarboxylic acid and an unsaturated aldehyde of the group consisting of acrolein, methacrolein and mixtures thereof.

The interpolymers of this invention contain 1.5–12.0 weight percent hydroxyl groups. Where the interpolymer is an interpolymer of vinyl acetate and allyl alcohol, this hydroxyl group content corresponds to an interpolymer containing 5–45 weight percent allyl alcohol. In a preferred embodiment of the invention, the interpolymers contain 4.0–10.0 weight percent hydroxyl groups. This corresponds to an allyl alcohol content of about 13–33 weight percent in vinyl acetate-allyl alcohol interpolymers. Interpolymers containing hydroxyl group contents outside of the limits discussed above do not have the utility of the interpolymers of the present invention.

In one method for the preparation of the interpolymers of this invention, a suitable monomeric vinyl ester and monomeric unsaturated alcohol are mixed, either with or without an organic solvent that is inert to the reactants, and heated to 150–200° C. under autogenous pressure. Preferably, such polymerizations are run in the presence of 0.1–5.0 parts of a free radical generating polymerization initiator per 100 parts of monomers. Typical examples of such initiators include ditertiary butyl peroxide, benzoyl peroxide, tertiary butyl perbenzoate, etc. The reaction time will usually vary from about 0.3 to 4.0 hours to obtain conversions varying from about 10% to about 70% depending upon the particular reaction conditions chosen.

The products of such polymerizations are generally syrupy liquids which comprise a solution of the desired interpolymer in unreacted monomers and solvent if a solvent is used. The interpolymer is easily recovered from such syrups by removing the unreacted monomers and solvents by vacuum distillation or other conventional drying techniques. The interpolymers range in physical properties from viscous liquids to hard colorless brittle resins.

In an alternate preparation, a suitable vinyl ester is interpolymerized with acrolein, methacrolein or mixtures thereof by suitable conventional polymerization techniques. The resulting interpolymer, which contains carbonyl groups, is then reduced to convert the carbonyl groups to hydroxyl groups. Such reductions can be carried out by dissolving the carbonyl group containing interpolymer in a solvent such as tetrahydrofurane and heating the polymer to 150–250° C. under 2000–5000 lbs. hydrogen pressure over a nickel hydrogenation catalyst. Frequently, the hydroxyl group containing interpolymers obtained by this technique have higher molecular weights than the corresponding polymers obtained by directly interpolymerizing the vinyl ester and allyl alcohol compound.

The products of this invention are useful as the main resin constituent in coating compositions which also contain relatively minor amounts of other coating resins containing functional groups that are reactive with the hydroxyl groups contained in the interpolymers of this invention. Examples of coating resins which contain such reactive groups are the alkyd resins, the phenol-, urea-, and melamine-formaldehyde condensates, the epoxy resins, etc. Among the most valuable coating compositions that can be prepared from the interpolymers of this invention are those compositions comprising a major amount of the interpolymer and a minor amount of a methylol melamine ether. Alternatively, the interpolymers of this invention may be used in coating compositions in relatively small amounts as modifiers for coating resins of the type described immediately above. The interpolymers of this invention also may be employed to prepare air-drying varnish resins. Such varnish resins may be prepared by esterifying the interpolymers of this invention with unsaturated fatty acids derived from the drying and semi-drying oils such as linseed oil, soybean oil, cottonseed oil, etc.

EXAMPLE VIII

A coating composition is prepared by dissolving 4 parts of the interpolymer of Example III and 2 parts of a tetrapropyl ether of tetramethylol melamine in 4 parts of a 50/50 xylol-butanol solvent mixture. Films of this coating composition are cast on tin plate, air-dried and cured by heating for 60 minutes at 150° C. The resulting clear films are hard, have excellent adhesion to the tin plate and excellent xylol resistance.

EXAMPLE IX

A coating composition similar to that of Example VIII is prepared except that the tetrapropyl ether of tetramethylol melamine is replaced with a high viscosity, organic solvent soluble urea-formaldehyde coating resin. Films of the resulting coating composition are cast on tin plate, air-dried and cured for 30 minutes at 150° C. The resulting films are very hard and clear, have excellent adhesion to the tin plate and excellent xylol resistance.

EXAMPLE X

Examples VIII and IX are repeated except that the resin of Example III is replaced with the resin of Example VI. In the case of both coating compositions, comparable results are obtained.

Various pigments, fillers, dyes and other conventional coating composition additives may be added to the coating compositions such as those described in Examples VIII–X. Other organic solvents may be used as the vehicle for the coating compositions; e.g., ketones such as acetone and methyl ethyl ketone, toluene, and aliphatic alcohols.

A further utility of the interpolymers of this invention is their ability to function as auxiliary suspending agents in conjunction with water-soluble interpolymers of maleic compounds in the suspension polymerization of vinyl halide-containing polymers. The use of the interpolymers of this invention as auxiliary suspending agents in such polymerizations is more fully described and claimed in the copending application of Richard H. Martin, Jr., Serial No. 592,492, filed of even date herewith, now U.S. 2,917,494, and that description is incorporated herein by reference.

The above descriptions and particularly the examples are set forth by way of illustration only. Many other variations and modifications thereof will be apparent to those skilled in the art and can be made without departing from the spirit and scope of the invention herein described.

What is claimed is:

1. A binary interpolymer having combined therein only polymerized monomer units (a) of the formula:

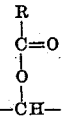

where R is selected from the group consisting of hydrogen and alkyl groups containing 1–3 carbon atoms and polymerized monomer units (b) of the formula:

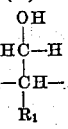

where $R_1$ is selected from the group consisting of hydrogen and methyl radicals; said polymerized monomer units (a) and (b) being present in such proportions that the interpolymer contains 1.5–12.0 weight percent hydroxyl groups.

2. A binary interpolymer having combined therein 55–95 weight percent of polymerized vinyl acetate and, correspondingly, 45–5 weight percent of polymerized allyl alcohol.

3. A binary interpolymer having combined therein 55–95 weight percent of polymerized vinyl butyrate and, correspondingly, 45–5 weight percent of polymerized allyl alcohol.

4. A process for preparing a binary interpolymer of a vinyl ester of a 1–4 carbon atom saturated aliphatic monocarboxylic acid and an unsaturated alcohol of the group consisting of allyl alcohol, methallyl alcohol and mixtures thereof which comprises heating a monomer mixture consisting of 50–90 weight percent of the vinyl ester and, correspondingly, 50–10 weight percent of the unsaturated alcohol to a temperature of 150–250° C. under autogenous pressure for from 0.3 to 4 hours.

5. A coating composition comprising an organic solvent solution of a binary interpolymer of claim 1 and a thermosetting resin of the group consisting of alkyd resins, epoxy resins and the phenol-, urea-, and melamine-formaldehyde condensates.

6. A coating composition as in claim 5 wherein the thermosetting resin is an ether of a methylol melamine.

References Cited in the file of this patent

UNITED STATES PATENTS

| | | |
|---|---|---|
| 2,441,516 | Snyder | May 11, 1948 |
| 2,464,290 | Bowen | Mar. 15, 1949 |
| 2,557,266 | Dittmar et al. | June 19, 1951 |
| 2,560,495 | Tawney | July 10, 1951 |
| 2,600,420 | Neher et al. | June 17, 1952 |
| 2,605,259 | Germain | July 29, 1952 |
| 2,657,192 | Miller et al. | Oct. 27, 1953 |
| 2,681,897 | Frazier et al. | June 22, 1954 |
| 2,733,229 | Brace | Jan. 31, 1956 |
| 2,740,771 | Longley et al. | Apr. 3, 1956 |
| 2,809,186 | Smith et al. | Oct. 8, 1957 |

FOREIGN PATENTS

| | | |
|---|---|---|
| 164,814 | Austria | Dec. 27, 1949 |

UNITED STATES PATENT OFFICE

CERTIFICATE OF CORRECTION

Patent No. 2,945,835　　　　　　　　　　　　July 19, 1960

Earl C. Chapin et al.

It is hereby certified that error appears in the printed specification of the above numbered patent requiring correction and that the said Letters Patent should read as corrected below.

Column 2, line 20, after "carbon" insert -- atoms --.

Signed and sealed this 20th day of December 1960.

(SEAL)
Attest:

KARL H. AXLINE
Attesting Officer

ROBERT C. WATSON
Commissioner of Patents